(12) United States Patent
Zhang et al.

(10) Patent No.: US 8,107,021 B2
(45) Date of Patent: Jan. 31, 2012

(54) LIQUID CRYSTAL PROJECTION APPARATUS UTILIZING IMAGE SYNTHESIZING UNIT WITH LIQUID CRYSTAL PANEL HOLDERS

(75) Inventors: Xianglin Zhang, Shenzhen (CN); Jieyang Wu, Shenzhen (CN); Tadashi Renbutsu, Hyogo (JP); Shoji Okazaki, Higashiosaka (JP); Yanshan Huang, Shenzhen (CN)

(73) Assignees: SANYO Electric Co., Ltd., Moriguchi, Osaka (JP); SANYO Technology Center (Shenzhen) Co., Ltd., Shenzhen (CN)

( * ) Notice: Subject to any disclaimer, the term of this patent is extended or adjusted under 35 U.S.C. 154(b) by 471 days.

(21) Appl. No.: 12/368,484

(22) Filed: Feb. 10, 2009

(65) Prior Publication Data
US 2009/0231498 A1 Sep. 17, 2009

(30) Foreign Application Priority Data
Mar. 14, 2008 (CN) .......................... 2008 1 0081187

(51) Int. Cl.
*G02F 1/1335* (2006.01)
*G03B 21/26* (2006.01)
*G03B 21/00* (2006.01)

(52) U.S. Cl. ............. 349/5; 349/6; 349/7; 349/8; 349/9; 353/28; 353/29; 353/31; 353/33

(58) Field of Classification Search .................. 349/5–9; 353/28–29, 31, 33
See application file for complete search history.

(56) References Cited

U.S. PATENT DOCUMENTS

| | | | | |
|---|---|---|---|---|
| 7,114,811 | B2 * | 10/2006 | Arai et al. | 353/20 |
| 7,137,705 | B2 * | 11/2006 | Kitabayashi | 353/31 |
| 7,147,333 | B2 * | 12/2006 | Shirota | 353/81 |
| 7,175,283 | B2 * | 2/2007 | Kitabayashi et al. | 353/54 |

FOREIGN PATENT DOCUMENTS

| | | |
|---|---|---|
| CN | 200965613 Y | 10/2007 |
| JP | 11202790 A * | 7/1999 |
| JP | 2001-337262 A | 12/2001 |

OTHER PUBLICATIONS

Chinese Office Action dated Jun. 11, 2010, issued in corresponding Chinese Patent Application No. 200810081187.

* cited by examiner

*Primary Examiner* — Hoan C Nguyen
(74) *Attorney, Agent, or Firm* — Westerman, Hattori, Daniels & Adrian, LLP

(57) ABSTRACT

A liquid crystal projection apparatus having an image synthesizing unit including a color synthesization prism having an upper surface, a lower surface facing the upper surface, and three light incident faces between the upper and lower surfaces; an upper prism pedestal provided on the upper surface of the color synthesization prism; a lower prism pedestal provided on the lower surface of the color synthesization prism; an upper liquid crystal panel holder provided on the upper prism pedestal and having first jointing sections, a lower liquid crystal panel holder provided on the lower prism pedestal and having second jointing sections; three liquid crystal panels; and three liquid crystal panel mounting members securely fixing thereon the three liquid crystal panels, the three mounting members arranged on the respective three incident faces of the color synthesization prism joining the first jointing sections located in association with the respective incident faces to corresponding second jointing sections located in association with the corresponding incident faces.

10 Claims, 6 Drawing Sheets

LIQUID CRYSTAL PROJECTION APPARATUS UTILIZING IMAGE SYNTHESIZING UNIT WITH LIQUID CRYSTAL PANEL HOLDERS

FIELD OF THE INVENTION

This invention relates to a liquid crystal projection apparatus, and more particularly, to one utilizing image synthesizing means.

BACKGROUND OF THE INVENTION

Along with recent rapid development of light-weight low-cost projection apparatuses, development of image synthesization units (image synthesizing means) is underway, since image synthesization units are important parts of such projection apparatuses.

For example, Chinese Utility Model No. 200620133278.7 discloses an image synthesization unit 3 coupled to an optical system 2 of a projection apparatus as shown in FIGS. 8 and 9.

In this utility model, white light emitted from a lamp unit 4 is led to a first dichroic mirror 26 via a first integrator lens 21, pre-stage light-shielding lattice 23, second integrator lens 22, post-stage light-shielding lattice 24, polarization prism plate 25, and condenser lens 20.

The first integrator lens 21 and the second integrator lens 22 each consist of fly-eye lenses made of a heat-resistant glass to make uniform the illuminance distribution of the white light emitted from the lamp unit 4.

The pre-stage and post-stage light-shielding lattices 23 and 24, respectively, are made of a thin aluminum plate. They are provided to shield unwanted light that would be otherwise incident on the polarization prism plate 25.

The light, which has passed through the polarization prism plate 25, reaches the first dichroic mirror 26 through a condenser lens 20.

The first dichroic mirror 26 reflects only blue light and transmits red and green lights, while the second dichroic mirror 27 reflects green light and transmits red light. A field mirror 28 reflects red light.

Thus, the white light emitted from the lamp unit 4 is decomposed into green, blue, and red lights by means of the first and second dichroic mirrors 26 and 27, respectively, before the light is led to the image synthesization unit 3.

As shown in FIGS. 9 and 10, the image synthesization unit 3 has: a cubic color synthesization prism 31; a prism pedestal 30 consisting of an upper and lower prism pedestals 301 and 302, respectively, for fixing therebetween the color synthesization prism 31; liquid crystal panels 33b, 33g, and 33r, respectively, for blue, green, and red light (referred to as blue, green, and red liquid crystal panels, respectively) arranged on three different sides of the color synthesization prism 31; and liquid crystal panel holders 38b, 38g, and 38r for fixing thereon corresponding liquid crystal panels 33b, 33g, and 33r. The liquid crystal panel holders 38b, 38g, and 38r are jointed together by the prism pedestal 30 to form the integral image synthesization unit 3.

The blue light reflected by the first dichroic mirror 26 and by the field mirror 29a shown in FIG. 8 is led to a condenser lens 35b, and, after passing through it, reaches the color synthesization prism 31 via a polarization plate for blue incident light (referred to as blue polarization plate) 32b, liquid crystal panel for blue light (referred to as blue liquid crystal panel) 33b, and polarization plate for emerging blue light (referred to as emergence blue polarization plate) 34b.

The green light reflected by the second dichroic mirror 27 is led to the condenser lens 35g, and, after passing through it, reaches the color synthesization prism 31 via a polarization plate for green incident light (referred to as green incident polarization plate) 32g, liquid crystal panel for green light (referred to as green liquid crystal panel) 33g, and polarization plate for emerging green light (referred to as emergence green polarization plate) 34g.

The red light reflected by the field mirrors 28 and 29b are led to a condenser lens 35r, and, after passing through it, reaches a polarization plate for red incident light (referred to as red incident polarization plate) 32r, liquid crystal panel for red light (referred to as red liquid crystal panel) 33r, and polarization plate for emerging red light (referred to as emergence red polarization plate) 34r.

The imaging lights of three primary colors led to the color synthesization prism 31 are synthesized by the color synthesization prism 31 into a single beam of colored imaging light, which is projected onto a front screen through a projection lens 39.

Referring to FIGS. 9 and 10 again, the color synthesization prism 31 is securely fixed in position by the upper and lower prism pedestals 301 and 302, respectively. The liquid crystal panel holders 38b, 38g, and 38r are fixed to the upper and lower prism pedestals 301 and 302, respectively.

The blue, green, and red liquid crystal panels 33b, 33g, and 33r are respectively fixed to three mounting members 37 with screws.

The three mounting members 37 are respectively soldered to the liquid crystal panel holders 38b, 38g, and 38r after they are optically aligned for correct collimation and focusing of imaging lights.

The liquid crystal panel holders 38b, 38g, and 38r are in turn fixed to the prism pedestal 30 by means of multiple screws 3801 that penetrate holes (not shown) of the liquid crystal panel holders 38b, 38g, and 38r and are screwed into threaded bores (not shown) formed in the prism pedestal 30. However, such fixation of the liquid crystal panel holders 38b, 38g, and 38r to the prism pedestal 30 is not satisfactory for the following reasons.

First, each of the liquid crystal panel holders 38b, 38g, and 38r need be simultaneously assembled onto at least two sides (referred to as assembling faces) of the upper and lower prism pedestals 301 and 302, which will result in precision errors of the liquid crystal panel holders, which in turn causes deformations of the liquid crystal panel holders during their assembly, which deformations affects collimation of light by the optical system.

As shown in FIG. 10, the respective liquid crystal panel holders 38b, 38g, and 38r have soldering joint sections 380 located at a significant distance from the respective screws 3801. As a consequence, the soldering joint sections 380 are likely to undergo significantly large deformations around the screws 3801 serving as fixed supports of the soldering joint sections 380. Such large deformations of the soldering joint sections directly affect the collimation of light.

Further, the three liquid crystal panel holders 38b, 38g, and 38r fixed on the three sides of the prism pedestal 30 add weight and cost to the image synthesization unit 3.

Therefore, there is a need for a liquid crystal projection apparatus equipped with an image synthesization unit that is free of such drawbacks as mentioned above.

SUMMARY OF THE INVENTION

It is, therefore, an object of the invention to provide a liquid crystal projection apparatus equipped with image synthesizing means that involves a reduced number of parts and has a high assembling precision.

To achieve this object, there is provided in accordance with the invention a liquid crystal projection apparatus for projecting colored imaging light obtained by image synthesizing means that is adapted to illuminate three liquid crystal panels with lights of three primary colors to generate imaging lights of three primary colors and synthesize the imaging lights into the colored imaging light, the image synthesizing means comprising:

a color synthesization prism having an upper surface, a lower surface facing the upper surface, and three light-entering faces (hereinafter referred to as incident faces) between the upper and lower surfaces;

an upper prism pedestal provided on the upper surface of the color synthesization prism;

a lower prism pedestal provided on the lower surface of the color synthesization prism;

an upper liquid crystal panel holder provided on the upper prism pedestal and having a multiplicity of first jointing sections, a lower liquid crystal panel holder provided on the lower prism pedestal, and having a multiplicity of second jointing sections;

three liquid crystal panels; and three liquid crystal panel mounting members securely fixing thereon the three liquid crystal panels, the three liquid crystal panel mounting members arranged on the respective three incident faces of the color synthesization prism and adapted to joint the first jointing sections located in association with the respective incident faces to corresponding second jointing sections located in association with the corresponding incident faces.

Thus, the liquid crystal panel holders are independently fixed on the respective prism pedestals. Since each of the liquid crystal panel holders has only one assembling face in contact with the prism pedestal, it can eliminate the influence of conventional precision error caused by the deformation of liquid crystal panel holder in contact with more than one assembling faces. Furthermore, unlike conventional image synthesizing means utilizing three liquid crystal panel holders, the invention uses only two (i.e. upper and lower liquid crystal panel holders) to reduce the weight and cost of an image synthesizing means.

Furthermore, the upper prism pedestal has a generally quadrangular first frame and four first projecting sections extending from the four corners of the first frame. The upper liquid crystal panel holder is mounted on the upper prism pedestal by fixing the upper liquid crystal panel holder to the four first projecting sections. As a consequence, the sections of the upper liquid crystal panel holder coupled to the upper prism pedestal are located close to the respective first jointing sections.

Preferably, the coupling of the upper liquid crystal panel holder and the upper prism pedestal is implemented by means of screws that penetrate the upper liquid panel holder and get screwed in the threaded bores formed in the first projecting sections of the upper prism pedestal.

Similarly, the lower prism pedestal has a generally quadrangular second frame and four second projecting sections extending from the four corners of the second frame. The lower liquid crystal panel holder is mounted on the lower prism pedestal by fixing the lower liquid crystal panel holder to the four second projecting sections. As a consequence, the sections of the lower liquid crystal panel holder coupled to the lower prism pedestal are located close to the respective second jointing sections.

Preferably, the coupling of the lower liquid crystal panel holder and the lower prism pedestal is implemented by means of screws that penetrate the lower liquid panel holder and get screwed in the threaded bores formed in the second projecting sections of the lower prism pedestal.

Preferably, the upper liquid crystal panel holder has a first body and four first arm sections that extend from the respective four corners of the first body, and the first jointing sections are each provided at the respective ends of the first arm sections.

Preferably, the first body is of materially reduced design as compared with the first jointing sections.

Similarly, it is preferred that the lower liquid crystal panel holder has a second body and four second arm sections that extend from the respective four corners of the second body, and that the second jointing sections are each provided at the respective ends of the second arm sections.

Preferably, the second body is of materially reduced design as compared with the second jointing sections.

Preferably, the first jointing sections of the upper liquid crystal penal holder and the second jointing sections of the lower liquid crystal panel holder are jointed to the liquid crystal panel mounting members by either soldering or bonding.

BRIEF DESCRIPTION OF THE DRAWINGS

The invention will now be described in detail by way of example with reference to the accompanying drawings. It should be born in mind that the drawings are not to scale.

DETAILED DESCRIPTION OF THE PREFERRED EMBODIMENT

Referring to the accompanying drawings, a liquid crystal projection apparatus and relevant components thereof in accordance with the invention will now be described in detail. In what follows, the term "forward direction" refers to the direction of projecting an image by the image projection apparatus shown in FIG. 1, the term "right" refers to the right direction with reference to the forward direction. The terms "rear", "bottom", and "sides" of the apparatus are used in ordinary sense to refer to different sections of an apparatus of interest. Therefore, these terms may depend on how the apparatus is installed and used.

Figure 1:
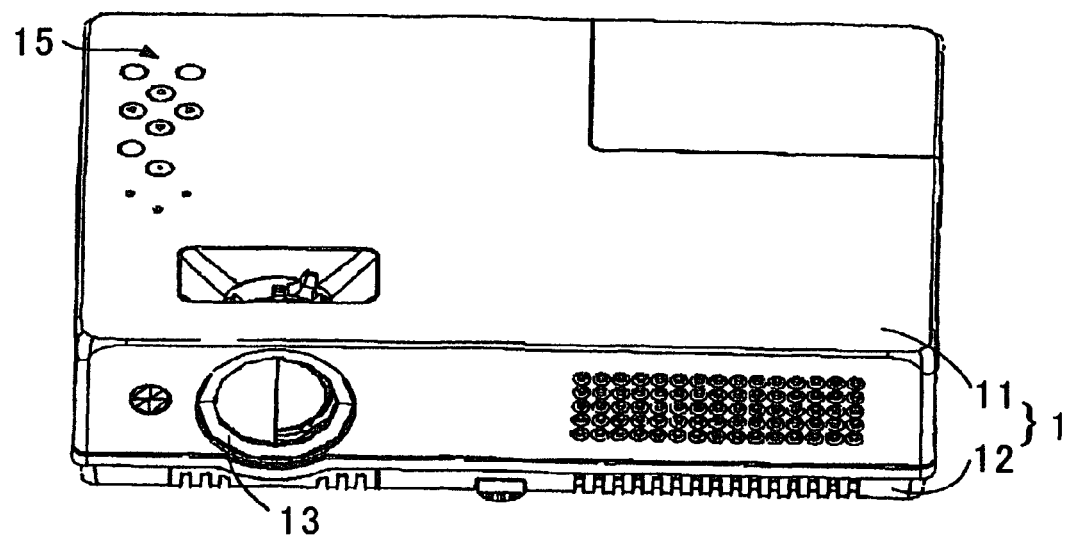
FIG. 1 is a perspective view of a liquid crystal projection apparatus in accordance with one embodiment of the invention.

Referring to FIG. 1, there is shown a liquid crystal projection apparatus of the present invention having a casing 1 which consists of an upper case 11 and a lower half case 12. Provided on the top end of the casing 1 is a control section 15 having a multiplicity of manually operable buttons. Formed in the front end of the casing 1 is a projection window 13.

Figure 2:
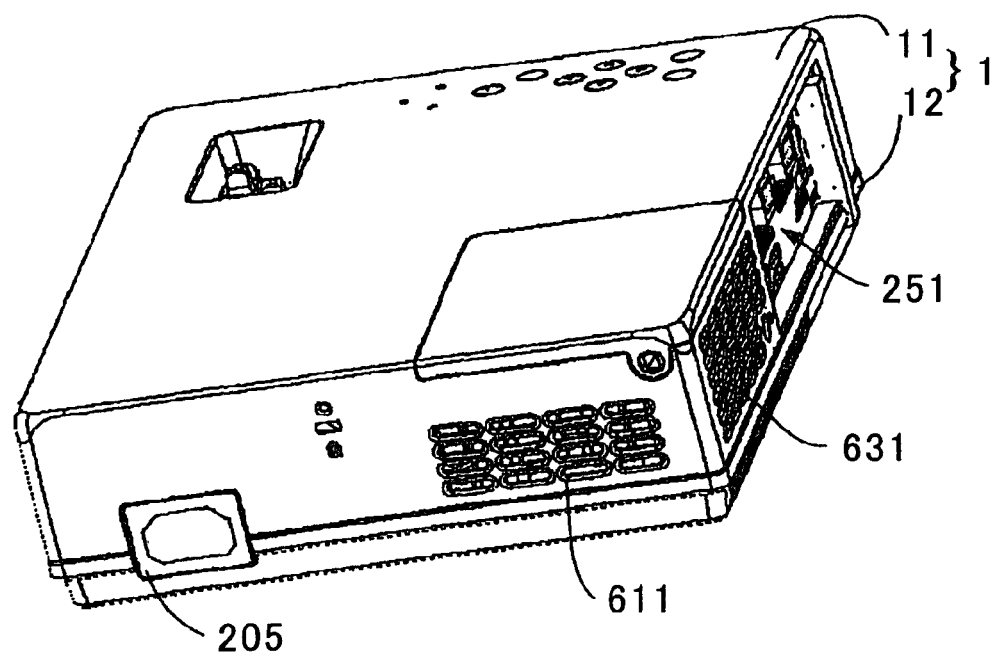
FIG. 2 is another perspective view of the liquid crystal projection apparatus of FIG. 1 taken from a different viewpoint.

Referring to FIG. 2, there is shown an air exhaust port 611 provided in one side of the casing 1, along with a power supply socket 205. Provided in the rear end of the casing 1 are an air exhaust port 631 and a composite terminal unit 251 that includes, for example, various external input terminals and a D-SUB terminal for connection with a computer.

These terminals of the terminal unit 251 can be embossed or engraved with names of the terminals by forming the terminals in metal molds, say. Thus, if the name of a terminal is "AUDIO", the name can be scribed on the surface of the terminal in a well discernible manner. Thus, there is not need of printing the names of the terminals, which facilitates enhancement of manufacturing efficiency and cost reduction.

Figure 3:
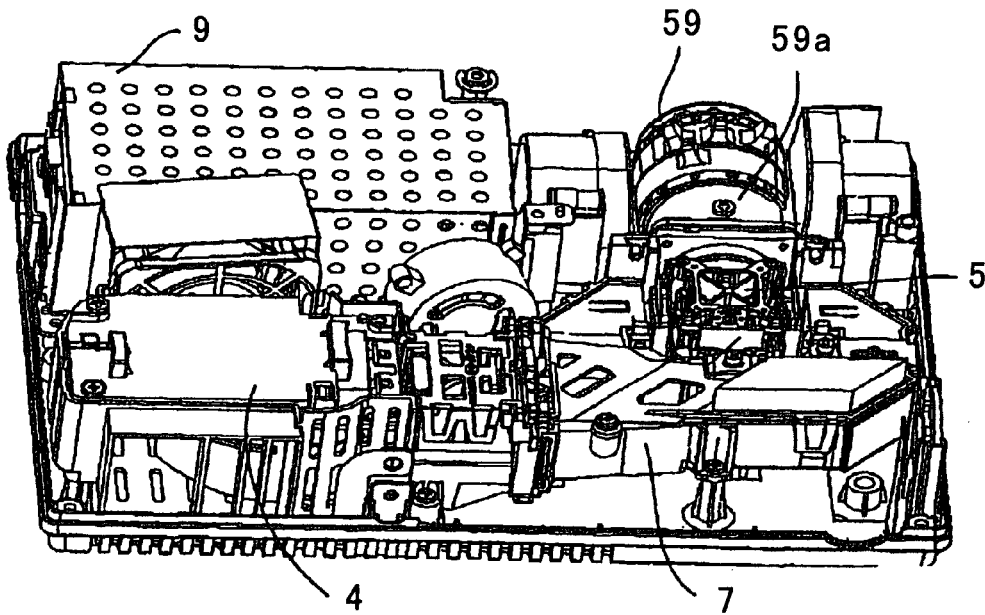
FIG. 3 is a perspective view of the liquid crystal projection apparatus of FIG. 1 with its upper case removed.
Figure 8:
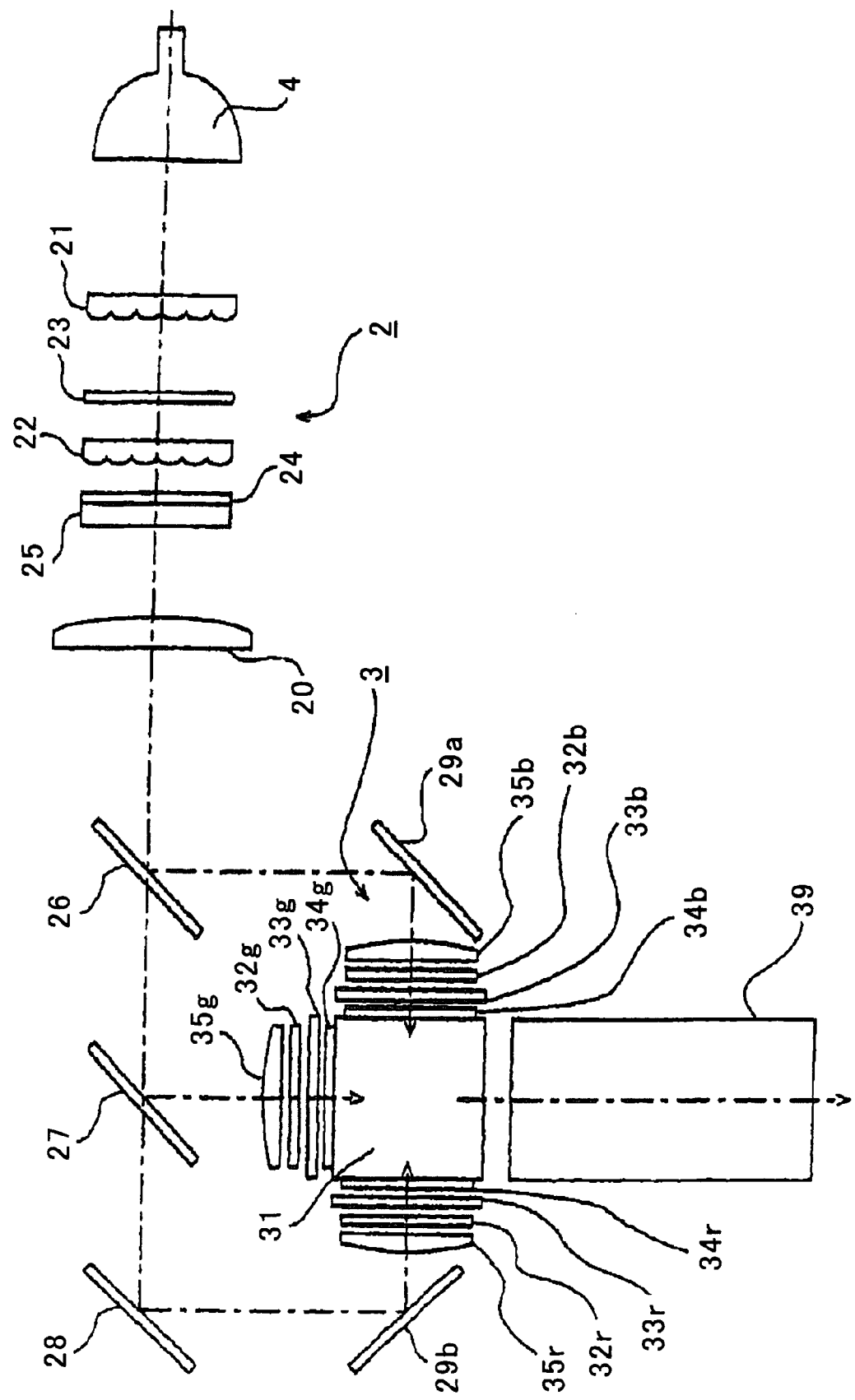
FIG. 8 is a plan view of an optical system and a conventional image synthesization unit used for use with a projection apparatus.
Figure 9:
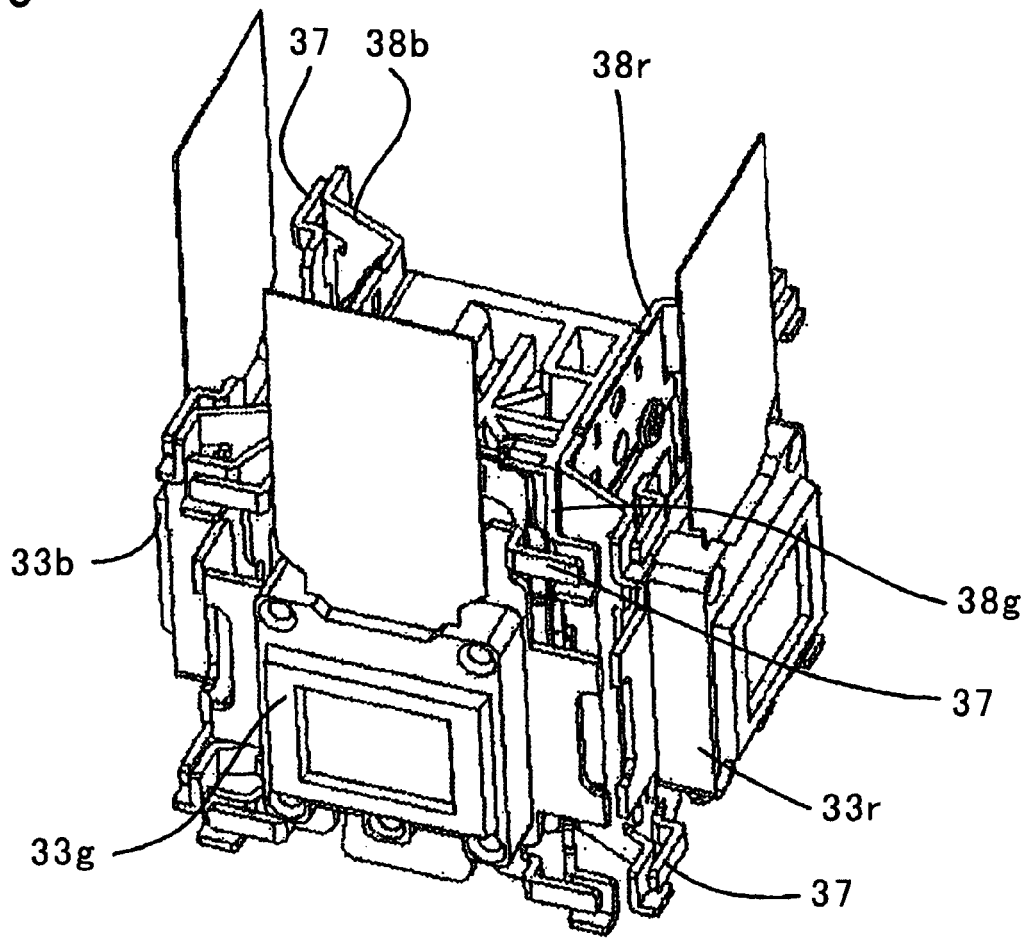
FIG. 9 is a perspective view of the image synthesization unit shown in FIG. 8.
Figure 10:
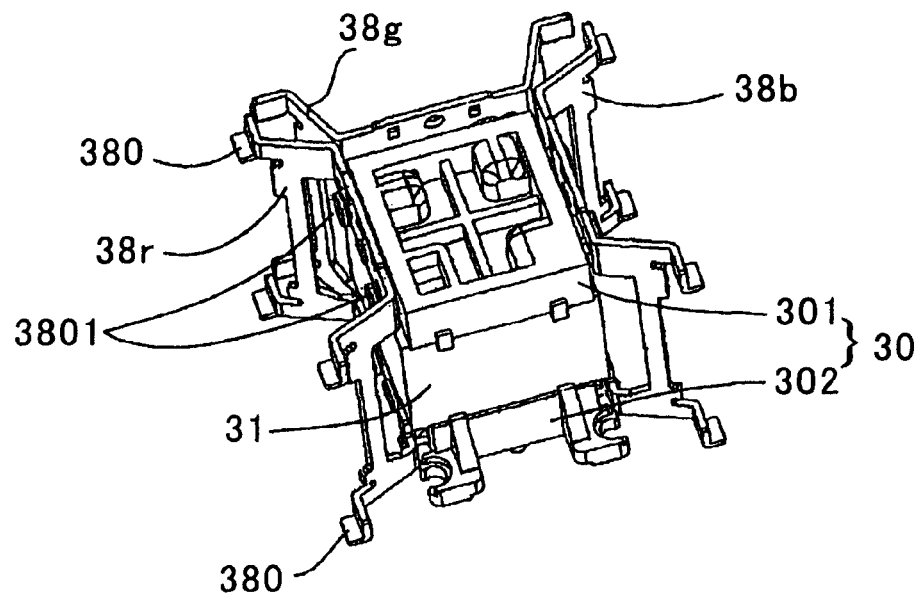
FIG. 10 is a perspective view of the prism, prism pedestal, and liquid crystal panel holders of the image synthesization unit shown in FIG. 8.

As shown in FIG. 3, a generally L-shaped optical engine 7, made of synthetic resins, is arranged in the casing 1. The optical engine 7 includes: a lamp unit 4 serving as a light source; an optical system (similar to the optical system 2 of FIG. 8) for decomposing white light from the lamp unit 4 into three beams of light of primary colors; and an image synthesization unit (image synthesizing means) 5 for irradiating three liquid crystal panels with the RGB lights to form RGB imaging lights and synthesizing the RGB imaging lights into a colored imaging light.

The lamp unit 4 is installed at the left end of the optical engine 7, and the image synthesization unit 5 at the front end of the optical engine 7. The optical system is disposed in the optical path of the optical engine 7 and between the lamp unit 4 to the image synthesization unit 5.

Connected to the front end of the optical engine 7 is the base section of a cylindrical member 59a for holding a projection lens 59. Arranged inside the casing 1 is a power supply unit 9 on the left side of the projection lens 59.

The inventive image synthesization unit 5 of the liquid crystal projection apparatus will now be described in detail below.

As shown in FIGS. 4 through 7, the image synthesization unit 5 includes: a cubic color synthesization prism 51; a prism pedestal 50 consisting of an upper prism pedestal 501 and a lower prism pedestal 502 for securely fixing the color synthesization prism 51 in position; a blue liquid crystal panel 53b, a green liquid crystal panel 53g, and a red liquid crystal panel 53r (FIG. 7) respectively mounted, by means of screws 55, on three liquid crystal mounting members 53 arranged on three incident faces of the color synthesization prism 51; a pre-stage polarization plate for green light (referred to as green pre-stage polarization plate) 54g provided between the green liquid crystal panel 53g and the color synthesization prism 51; a pre-stage polarization plate for blue light (referred to as blue pre-stage polarization plate) 54b provided between the blue liquid crystal panel 53b and the color synthesization prism 51; and an upper liquid crystal panel holder 58 and lower liquid crystal panel holder 59 for securely fixing in position the respective liquid crystal panels 53b, 53g, and 53r. The upper liquid crystal panel holder 58 is jointed to the upper prism pedestals 501 of the prism pedestal 50, and so is the lower liquid crystal panel holder 59 to the lower prism pedestal 502 of the prism pedestal 50, thereby forming the integral image synthesization unit 5. polarization plate) 54b provided between the blue liquid crystal panel 53g and the color synthesization prism 51; and an upper liquid crystal panel holder 58 and lower liquid crystal panel holder 59 for securely fixing in position the respective liquid crystal panels 53b, 53g, and 53r. The upper liquid crystal panel holder 58 is jointed to the upper prism pedestals 501 of the prism pedestal 50, and so is the lower liquid crystal panel holder 59 to the lower prism pedestal 502 of the prism pedestal 50, thereby forming the integral image synthesization unit 5.

Figure 4:
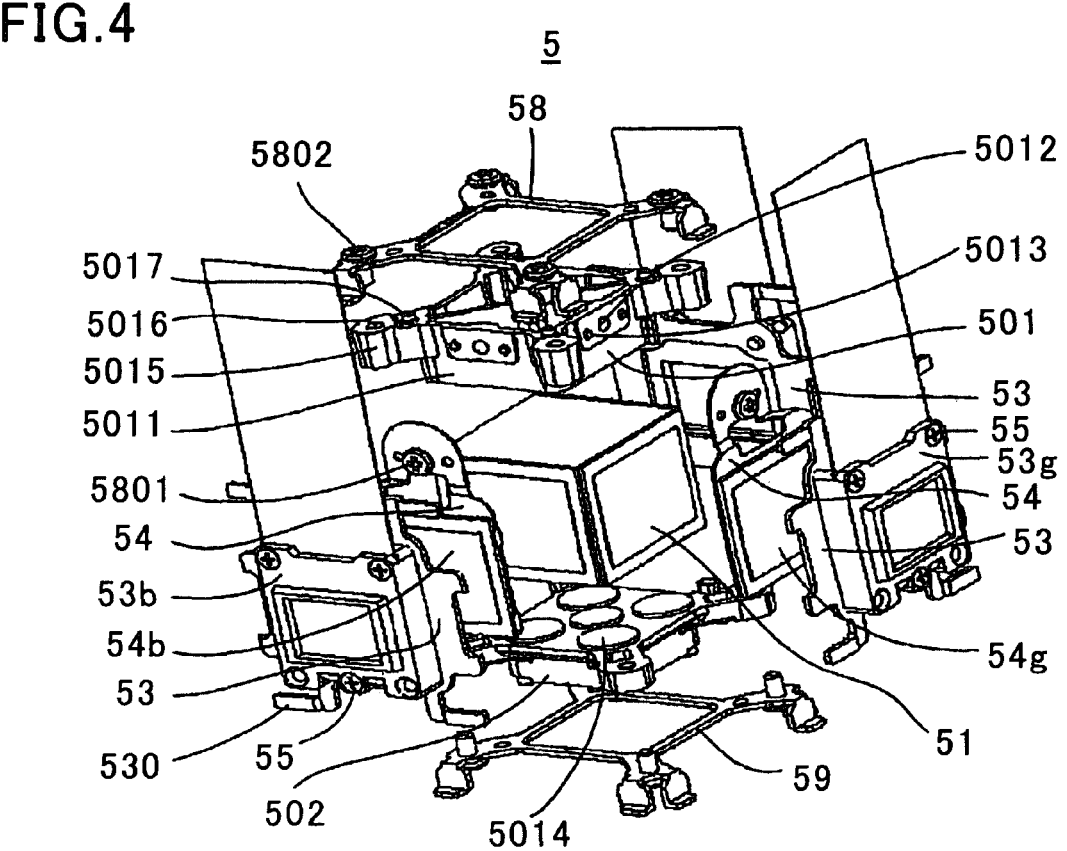
FIG. 4 is an exploded perspective view of an image synthesization unit of the liquid crystal projection apparatus of FIG. 1.

Referring to FIG. 4, the upper prism pedestal 501 is shown to have a quadrangular frame 5011 and four projecting sections 5015 extending from the four corners of the quadrangular frame 5011, which has two sides that face the blue and green liquid crystal panels 53b and 53g, respectively. Each of the two sides has a screw hole 5012. Provided on the opposite sides of the screw hole 5012 are two positioning pins 5013.

The quadrangular frame 5011 has on the underside thereof facing the color synthesization prism 51 a multiplicity of protruding jointing surfaces (which are similar to protruding joint surfaces 5014 shown in FIG. 4). Each of the protrusions 5015 has a positioning pin 5017 and a screw hole 5016, which are both offset from the color synthesization prism 51 such that the screw hole 5016 is located farther away from the frame 5011 than the positioning pin 5017. The lower prism pedestal 502 is similar in structure to the upper prism pedestal 501, except that the lower prism pedestal 502 has on the sides of its frame no screw hole or positioning pin, so that details of the lower prism pedestal 502 will be omitted.

Figure 5:
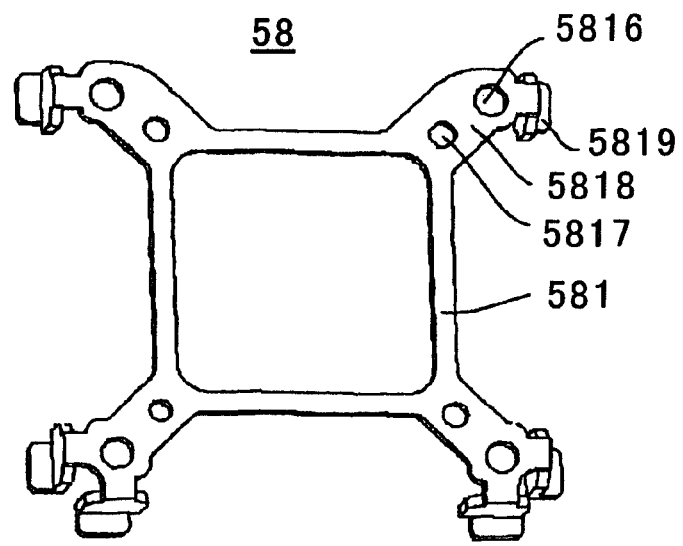
FIG. 5 is a perspective view of a liquid crystal panel holder shown in FIG. 4.
Figure 6:
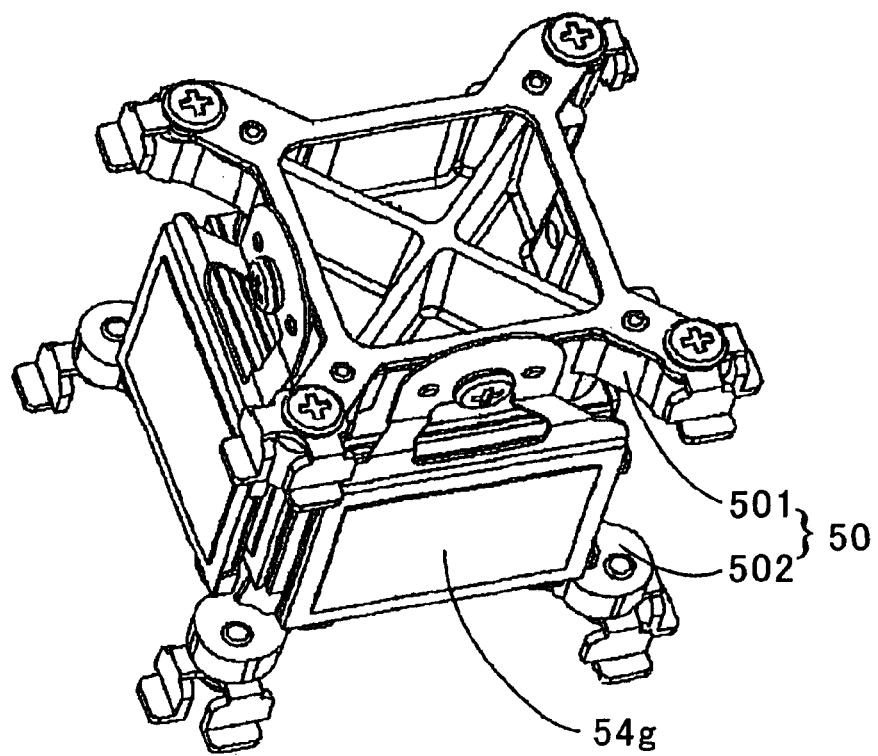
FIG. 6 is a perspective view of a prism, prism pedestals, and liquid crystal panel holders assembled together to form the image synthesization unit shown in FIG. 4.
Figure 7:
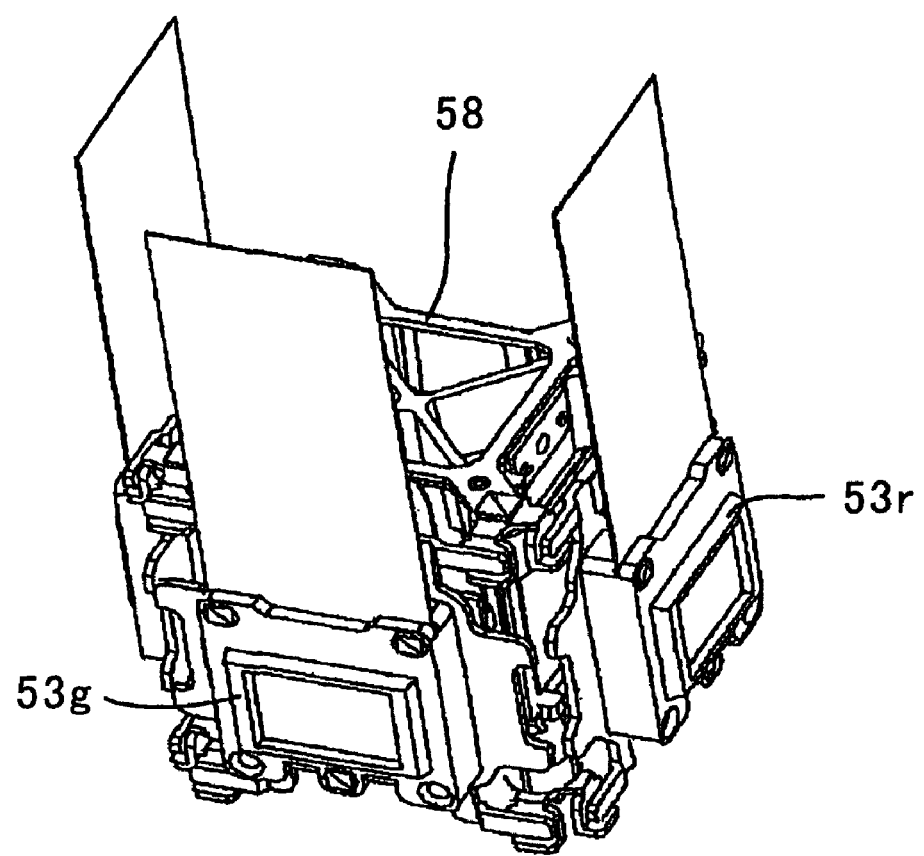
FIG. 7 is a perspective view of the image synthesization unit assembly for use with the liquid crystal projection apparatus in accordance with one embodiment of the invention.

Referring to FIG. 5, the upper liquid crystal holder 58 is shown to have a quadrangular frame or body 581, four arms 5818 extending from the four corners of the quadrangular body 581. The body 581 is also provided at the tips of the four arms 5818 with a number of soldering joint sections 5819 for jointing the liquid crystal panel mounting members 53 onto three sides of the upper liquid crystal panel holder 58. (For example, the upper liquid crystal panel holder 58 may be provided on the three sides thereof with six soldering joint sections 5819, with two soldering joint sections 5819 on each side.)

Each of the intermediate sections between the four corners of the body 581 is made hollow so as to be materially reduced (referred to be of materially reduced design) relative to the soldering joint sections 5819. For example, the frame body 581 may have a smaller cross section than the soldering joint sections 5819. Each of the arms 5818 has a pinhole 5817 for tightly receiving therein a positioning pin 5017 (FIG. 4), and a through-hole 5816 for allowing a screw 5802 (FIG. 4) to pass through it. The lower liquid crystal panel holder 59 can be substantially or exactly the same in structure as the upper liquid crystal panel holder 58 described above, so that details of the lower liquid crystal panel holder 59 will not be repeated here.

FIGS. 4-7 depict how the image synthesization unit 5 is assembled.

First, the color synthesization prism 51 can be securely fixed by the upper and lower prism pedestals 501 and 502, respectively.

Specifically, the color synthesization prism 51 is jointed at the top and bottom ends thereof to the upper and lower jointing surfaces 5014 of the upper and lower prism pedestals 501 and 502, respectively. To joint the color synthesization prism 51 to the jointing surfaces 5014, an ultraviolet cure adhesive may be used. It should be understood here that the actual distribution and the size of the jointing surfaces 5014 could be adjusted as needed.

A screw 5801 is passed through a hole (not shown) formed in the mounting member 54 for the blue pre-stage polarization plate 54b and tightly fitted in the threaded screw hole 5012 of the upper prism pedestal 501, and at the same time a positioning pin 5013 is tightly fitted into a corresponding pin hole formed in the mounting member 54 for the blue pre-stage polarization plate 54b. Thus, the mounting member 54 for the blue pre-stage polarization plate 54b is securely fixed in position to the upper prism pedestal 501. In the same way, the mounting member 54 for the green pre-stage polarization plate 54g is fixed in position to the upper prism pedestal 501.

Next, the upper liquid crystal panel holder 58 is placed on the upper prism pedestal 501, and positioning pins 5017 for the upper prism pedestal 501 are passed through the pinholes 5817 of the upper liquid crystal panel holder 58. Further, screws 5802 are passed through holes 5816 formed in the upper liquid crystal panel holder 58, and tightly fitted in the threaded screw holes 5016 formed in the upper prism pedestal 501. In this way, the upper liquid crystal panel holder 58 is securely fixed to the upper prism pedestal 501. Similarly, the lower liquid crystal panel holder 59 is securely fixed to the lower prism pedestal 502.

Further, the four soldering joint sections 530 of the mounting members 53 for the blue liquid crystal panel 53b are soldered to coplanar four soldering joint sections 5819 belonging to the upper and lower liquid crystal panel holder 58 and 59. Normally, the mounting member 53 for the blue liquid crystal panel 53b is securely fixed to the upper and lower liquid crystal panel holders 58 and 59, respectively, using a solder (or an alternative glue) after they are adjusted for correct collimation and focusing. The green and red liquid crystal panels 53g and 53r, respectively, are also securely fixed to the upper and lower liquid crystal panel holder 58 and 59, respectively, in the same manner.

This inventive image synthesization unit provides the following merits.

First, the liquid crystal panel holders are independently fixed to the respective prism pedestals. Since each of the liquid crystal panel holders of the invention has only one assembling face, light collimation is less affected by the distortions of the liquid crystal panel holders caused by assembly errors pertinent to the conventional multiple assembling faces.

Second, the weight and cost of the inventive image synthesization unit is reduced due to the fact that the unit requires only two liquid crystal panel holders (i.e. upper and lower holders) to fix the prism, as compared with a conventional image synthesization unit requiring three liquid crystal panel holders.

Moreover, since sections of the liquid crystal panel holders fixed with, for example, screws (referred to as screw-fixed sections) are provided in the projecting sections of the prism pedestals, the screw-fixed sections are now closer to the soldering joint sections than conventional screw-fixed sections, which greatly facilitates reduction of likelihood and degree of deformation of the fixed supports of the screw-fixed sections.

In environmental tests performed in a warehouse where temperature is 40° C. and humidity of 90%, a prism unit not incorporating the inventive configuration as described above exhibits a central displacement in light condensation in the range of 0.8-1 pixels at the center of an image plane. In contrast, similar tests performed on an inventive prism unit reveals that it exhibits a central displacement not more than 0.3 pixels.

The invention has been described and shown above by way of illustrative example. A person skilled in the art will understand that the invention encompasses many other modifications, equivalents, and alternatives without departing from the spirit and scope of the appended claims.

What we claim is:

1. A liquid crystal projection apparatus for projecting colored imaging light obtained by image synthesizing means that is adapted to illuminate three liquid crystal panels with lights of three primary colors to generate imaging lights of three primary colors and synthesize the imaging lights into the colored imaging light, the image synthesizing means comprising:

a color synthesization prism having an upper surface, a lower surface facing the upper surface, and three incident faces between the upper and lower surfaces;

an upper prism pedestal provided on the upper surface of the color synthesization prism;

a lower prism pedestal provided on the lower surface of the color synthesization prism;

an upper liquid crystal panel holder provided on top of the upper prism pedestal and having a multiplicity of first jointing sections, a lower liquid crystal panel holder provided on the bottom of the lower prism pedestal and having a multiplicity of second jointing sections;

three liquid crystal panels; and three liquid crystal panel mounting members securely fixing thereon the three liquid crystal panels, the three liquid crystal panel mounting members arranged on the respective three incident faces of the color synthesization prism and adapted to joint the first jointing sections located in association with the respective incident faces to corresponding second jointing sections located in association with the corresponding incident faces.

2. The liquid crystal projection apparatus according to claim 1, wherein the upper prism pedestal has a generally quadrangular first frame and four first projecting sections extending from the four corners of the first frame; and the upper liquid crystal panel holder is mounted on the upper prism pedestal by fixing the upper liquid crystal panel holder to the four first projecting sections to allow the sections of the upper liquid crystal panel holder coupled to the upper prism pedestal to be located close to the respective first jointing sections.

3. The liquid crystal projection apparatus according to claim 2, wherein the coupling of the upper liquid crystal panel holder and the prism pedestal is implemented by means of screws that penetrate the upper liquid panel holder and get screwed in the threaded bores formed in the first projecting sections of the upper prism pedestal.

4. The liquid crystal projection apparatus according to claim 1, wherein the lower prism pedestal has a generally quadrangular second frame and four second projecting sections extending from the four corners of the second frame; and the lower liquid crystal panel holder is mounted on the lower prism pedestal by fixing the lower liquid crystal panel holder to the four second projecting sections of the lower prism pedestal to allow the sections of the lower liquid crystal panel holder coupled to the lower prism pedestal to be located close to the respective second jointing sections.

5. The liquid crystal projection apparatus according to claim 4, wherein the coupling of the lower liquid crystal panel holder and the lower prism pedestal is implemented by means of screws that penetrate the lower liquid panel holder and get screwed in the threaded bores formed in the second projecting sections of the lower prism pedestal.

6. The liquid crystal projection apparatus according to claim 1, wherein the upper liquid crystal panel holder has a first body and four first arm sections that extend from the respective four corners of the first body; and the first jointing sections are each provided at the respective ends of the first arm sections.

7. The liquid crystal projection apparatus according to claim 6, wherein the first body is of materially reduced design as compared with the first jointing sections.

8. The liquid crystal projection apparatus according to claim 1, wherein the lower liquid crystal panel holder has a second body and four second arm sections that extend from the respective four corners of the second body; and the second jointing sections are each provided at the respective ends of the second arm sections.

9. The liquid crystal projection apparatus according to claim 8, wherein the second body is of materially reduced design as compared with the second jointing sections.

10. The liquid crystal projection apparatus according to claim 1, wherein the first jointing sections of the upper liquid crystal penal holder and the second jointing sections of the lower liquid crystal panel holder are jointed to the liquid crystal panel mounting members by either soldering or by bonding.

* * * * *